C. W. ABBOTT.
JOINT FOR ELECTRICAL CONDUITS.
APPLICATION FILED APR. 14, 1911.
1,065,492.
Patented June 24, 1913.
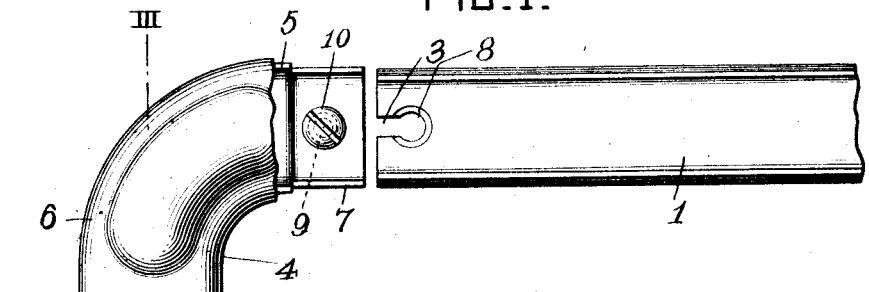
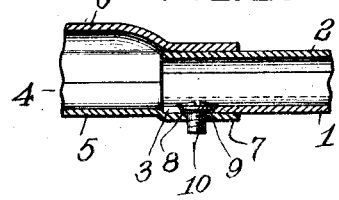
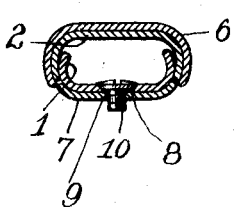
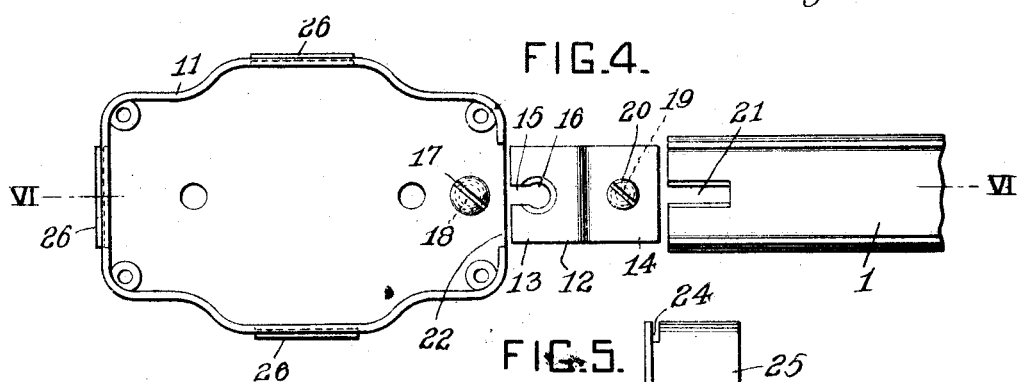
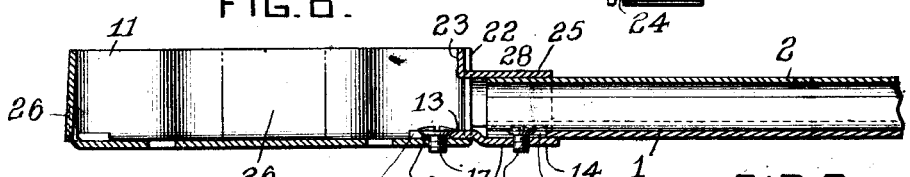
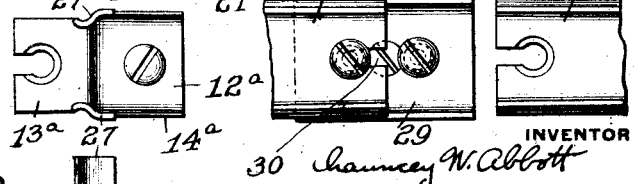
WITNESSES:
J. Herbert Bradley
Francis J. Tomasson
INVENTOR
Chauncey W. Abbott
by Christy & Christy, Atty's

UNITED STATES PATENT OFFICE.

CHAUNCEY W. ABBOTT, OF AUBURN, NEW YORK, ASSIGNOR TO NATIONAL METAL MOLDING COMPANY, A CORPORATION OF PENNSYLVANIA.

JOINT FOR ELECTRICAL CONDUITS.

1,065,492.  Specification of Letters Patent.   Patented June 24, 1913.

Application filed April 14, 1911. Serial No. 621,008.

*To all whom it may concern:*

Be it known that I, CHAUNCEY W. ABBOTT, residing at Auburn, in the county of Cayuga and State of New York, a citizen of the United States, have invented or discovered certain new and useful Improvements in Joints for Electrical Conduits, of which improvements the following is a specification.

The invention relates particularly to means for joining together adjacent sections or lengths of that class of electrical conduits known as metal moldings, and for joining sections of such moldings to junction-boxes and other fittings. Such moldings are usually made of an inner or base section adapted to abut against and be secured to a supporting surface such as a wall or ceiling, and a removable cover section. Certain features of the invention may however be employed in joints between conduit sections of other forms.

The object of the invention is to obtain neat and workmanlike joints, which may be easily and securely fastened together at the point of installation, and will afford the desired electrical continuity.

In the accompanying drawings, forming part of this specification, Figure 1 is a plan view of an elbow connection, showing the cover-section of the elbow-member broken away at one end, and the open base-section of an adjacent piece of molding about to be connected with the elbow-member. Fig. 2 is a sectional view on the line II—II of Fig. 1. Fig. 3 is a sectional view on the line III—III of Fig. 1; Fig. 4 is a view similar to Fig. 1 showing a junction-box with cover removed, the base-section of a piece of molding, and a connecting-piece, ready to be assembled; Fig. 5 is a top plan view of a closure-piece; Fig. 6 is a sectional view on the line VI—VI of Fig. 4, showing the assembled joint; Figs. 7 and 8 are views in plan and in side elevation respectively of a modified form of connecting-piece; Fig. 9 shows another embodiment of the invention.

The molding herein shown for purposes of illustration is of general elliptical form, made up of the inner or base-section 1 and the outer or cover-section 2, formed from strips of steel, or similar elastic material, so that the cover-section may be snapped upon and clamp the side-walls of the base-section.

In Fig. 1 the elbow 4 is made up of a semi-elliptical base-section 5 and a semi-elliptical cover-section 6; the ends of the cover-section 6 being preferably extended beyond the base-section 5 and adapted to be snapped upon and to clamp the cover-section 2 of the adjacent piece of molding. The base-section 5 of the elbow is here shown as provided with a tongue 7, which is bent slightly out of the plane of the floor of said base-section, to form a seat for the base-section 1 of the adjacent piece of molding. The section 1 is provided with a slot 3 at its end, leading to a countersunk hole 8 for a screw, or other attaching means, and in the tongue 7 there is formed a hole 9 for the shank of a screw 10.

In assembling the parts thus far described the screw 10 may first be partly inserted and secured in the hole 9, the base-section 1 of the adjacent piece of molding slipped into place upon the tongue 7 with the hole 8 immediately below the head of the screw, and the screw then be turned to final position to secure the parts firmly together. The cover-sections may then be applied as described. In this way adjacent sections of molding may be fastened together with little labor or inconvenience, since the necessary screws or other securing means may be applied to one of the sections before assembling, and the workman is not inconvenienced by the difficulty of handling the screws, which are often quite small, and inserting them in proper position while assembling the parts. A broad surface contact is also made between the sections, thus effectively providing for the desired electrical continuity of the molding as a whole.

In Figs. 4 and 6 there is illustrated a connection between the molding and a junction-box 11 which may be of any suitable form. In this instance, instead of providing the box or the molding with an integral tongue, a separate connecting-piece 12 may be used, which is preferably bent, as shown, so that one end 13 may rest on the floor of the box, while the other end 14 may act as a seat for the end of the base-section 1 of the molding. The end 13 of the piece 12 is therefore provided with the slot 15 and countersunk-hole 16 to be engaged by the head of screw 17 partly inserted and held in the hole 18 in the floor of the box; while the end 14 is provided with the hole 19 for the screw 20, with which engages the beveled slot 21 in the end of the base-section 1 of the molding. The box 11 is provided with the opening 22 which extends downwardly from the open edge of its wall, and after the connection has been made, and the cover 2 of the molding snapped in place, the closure-piece 28 is applied. This closure-piece has an inner flange 23 and opposite slots 24, so that it may engage the opposite edges of the opening 22 in the wall of the box, and a body portion 25 having curved wings adapted to be snapped upon and to clamp the end of the cover-section 2 of the molding. The walls of the box 11 may have any desired number of the usual knock-out portions 26 for connection with branch lines, and the box is finally closed by any suitable cover (not shown).

In Figs. 7 and 8 there is shown a modified form of connecting-piece 12$^a$, having the opposite ends 13$^a$ and 14$^a$ as already described and provided with the opposite bent ears 27 adapted to fit over the sharp edges at the sides of the opening 22 in the wall of the box, and thus protect the insulation on the conductors from injury.

In addition to the advantages already stated, it may be noted that in the employment of the invention, a close and exact fitting of abutting conduit members is rendered unnecessary, since in the embodiment shown in Figs. 1, 2 and 3 the joints are covered by the cover-section 6, while in the embodiment shown in Fig. 6 the joints will be covered by closure-pieces 28.

In Fig. 9 there are shown the ends of two adjacent sections of molding, with a plain connecting-piece 29 secured to the wall by a wood-screw 30, and upon the faces of which the molding sections are secured in the manner already described.

I claim as my invention:

1. In a joint for electrical conduits, the combination with a box provided with an opening, and a conduit member secured to the box adjacent to said opening, of a closure-piece provided with oppositely disposed slots engaging the opposite edges of said opening and with oppositely disposed wings clamped upon said conduit member.

2. In a joint for electrical conduits, the combination with a metal conduit system member provided with a threaded hole, and a screw having a head and a shank adapted to be partially inserted and held in said hole, of a section of metal conduit provided at its end with an open-ended slot extending longitudinally thereof, said slot being adapted to be slipped around the shank of said screw projecting from the hole and beneath the head thereof, and said conduit section adapted to be clamped to said conduit member by the further movement of said screw.

In testimony whereof I have hereunto set my hand.

CHAUNCEY W. ABBOTT.

Witnesses:
ALICE A. TRILL,
MARSHALL A. CHRISTY.